(12) United States Patent
Hee-Man et al.

(10) Patent No.: US 10,971,276 B2
(45) Date of Patent: Apr. 6, 2021

(54) COMPOSITION FOR REMOVING RADIONUCLIDE AND METHOD FOR REMOVING RADIONUCLIDE USING THE SAME

(71) Applicant: KOREA ATOMIC ENERGY RESEARCH INSTITUTE, Daejeon (KR)

(72) Inventors: Yang Hee-Man, Daejeon (KR); ChanWoo Park, Gyeonggi-do (KR); Lee Kune-Woo, Daejeon (KR); Ilgook Kim, Daejeon (KR); In-Ho Yoon, Daejeon (KR); BumKyoung Seo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 6 days.

(21) Appl. No.: 15/928,697

(22) Filed: Mar. 22, 2018

(65) Prior Publication Data
US 2019/0139664 A1 May 9, 2019

(30) Foreign Application Priority Data

Nov. 6, 2017 (KR) .................. 10-2017-0146458
Feb. 27, 2018 (KR) .................. 10-2018-0024040

(51) Int. Cl.
*G21F 9/12* (2006.01)
*B01D 71/08* (2006.01)
*B01D 71/40* (2006.01)
*B01D 71/38* (2006.01)
*C08L 5/04* (2006.01)
(Continued)

(52) U.S. Cl.
CPC ............... *G21F 9/12* (2013.01); *B01D 71/08* (2013.01); *B01D 71/38* (2013.01); *B01D 71/40* (2013.01); *B82Y 25/00* (2013.01); *C08K 3/013* (2018.01); *C08L 5/04* (2013.01); *G21F 9/001* (2013.01); *B01D 2257/60* (2013.01); *C08K 5/55* (2013.01); *C08K 2003/2265* (2013.01); *C08K 2201/013* (2013.01); *C08L 5/00* (2013.01);
(Continued)

(58) Field of Classification Search
None
See application file for complete search history.

(56) References Cited

U.S. PATENT DOCUMENTS

2013/0037048 A1* 2/2013 Edgington ............... A62D 5/00
134/4

FOREIGN PATENT DOCUMENTS

KR 10-1658475 9/1916

OTHER PUBLICATIONS

Duncan et al., "Soft, Peelable Organogels from Partially Hydrolyzed Poly(vinyl acetate) and Benzene-1,4-diboronic Acid: Applications to Clean Works of Art", ACS Appl. Mater. Interfaces, Aug. 8, 2017, 9, 33, 28069-28078 (Year: 2017).*
Gray et al., "Smart Polymeric Coatings for Surface Decontamination", Ind. Eng. Chem. Res. 2001, 40, 16, 3540-3546 (Year: 2001).*
Guo et al., "Facile Access to Multisensitive and Self-Healing Hydrogels with Reversible and Dynamic Boronic Ester and Disulfide Linkages", Biomacromolecules, Mar. 21, 2017, 18, 4, 1356-1364 (Year: 2017).*

(Continued)

*Primary Examiner* — Jonathan M Peo
(74) *Attorney, Agent, or Firm* — Norton Rose Fulright US LLP

(57) ABSTRACT

The present invention relates to a composition for removing a radionuclide, including: a first polymer including a hydroxy group; a second polymer into which a boronic acid group is introduced as a functional group; and an adsorbent for removing the radionuclide, and a method for removing a radionuclide using the same.

6 Claims, 10 Drawing Sheets

(51) Int. Cl.
  *B82Y 25/00* (2011.01)
  *G21F 9/00* (2006.01)
  *C08K 3/013* (2018.01)
  *C08K 5/55* (2006.01)
  *C08L 33/26* (2006.01)
  *C08L 5/00* (2006.01)
  *C08L 29/04* (2006.01)
  *C08L 57/10* (2006.01)
  *C08L 35/00* (2006.01)
  *C08K 3/22* (2006.01)
(52) U.S. Cl.
  CPC ............... *C08L 29/04* (2013.01); *C08L 33/26* (2013.01); *C08L 35/00* (2013.01); *C08L 57/10* (2013.01)

(56) References Cited

OTHER PUBLICATIONS

Yang, et al. "Enhanced surface decontamination of radioactive Cs by self-generated, strippable hydrogels based on reversible cross-linking," *Journal of Hazardous Materials*, 2019, 362:72-81.

Yang, et al. "Polyvinyl alcohol-borate hydrogel containing magnetic adsorbent for surface decontamination," *Annals of Nuclear Energy*, 2017, 109:359-364.

Yang, et al. "Polymeric coatings for surface decontamination and ecofriendly volume reduction of radioactive waste after use," *Progress in Nuclear Energy*, 2018, 104:6774.

\* cited by examiner

COMPOSITION FOR REMOVING RADIONUCLIDE AND METHOD FOR REMOVING RADIONUCLIDE USING THE SAME

CROSS-REFERENCE TO RELATED APPLICATION

This application claims priority to and the benefit of Korean Patent Application No. 2018-0024040, filed on Feb. 27, 2018, and Korean Patent Application No. 2017-0146458, filed on Nov. 6, 2017, the disclosures of which are incorporated herein by reference in their entireties.

BACKGROUND

1. Field of the Invention

The present invention relates to a composition for removing a radionuclide and a method for removing a radionuclide using the same.

2. Discussion of Related Art

Radionuclides have been used in the nuclear power field as well as various research and industrial sites. Accordingly, in facilities dealing with radionuclides, particularly, nuclear power facilities, the surfaces of concrete, cement, paint, metal, and the like are inevitably contaminated with the radionuclide. Meanwhile, large amounts of radionuclides were released into the environment during the Chernobyl and Fukushima nuclear power station accidents, and the surfaces of various buildings in the residential area where people were living and numerous facilities such as roads were contaminated with the radionuclides. Accordingly, the development of decontamination technologies which economically and effectively remove radionuclides present on various contaminated surfaces has been actively studied.

Among them, a method for removing a radionuclide from a contaminated surface using high pressure water has been frequently applied, but exhibits a low removal efficiency of 35 to 90% according to the environment, and has a problem in that high pressure water is contaminated with the radionuclide after being used, and as a result, a large amount of contaminated water is generated. Accordingly, in order to improve a low removal efficiency of a washing method using high pressure water, washing methods using ion washing (for example, ammonium salts) that uses ion exchange with a radionuclide present on a contaminated surface have been attempted, but the methods still have a problem in that a large amount of contaminated water is generated.

Meanwhile, among the methods for removing a radionuclide from a contaminated surface, when a method in which a strippable coating agent such as DeconGel is used as a means by which a large amount of contaminated water is not generated, the method exhibited an excellent radionuclide removal efficiency of 70 to 90%, but has two disadvantages. The first disadvantage is that a chelator, which is a constituent component of the coating agent itself and a substance toxic to the human body as a solvent are used, and the second disadvantage is that it takes approximately 24 hours or more to dry the solvent of the coating agent, thus the method has a problem in that the decontamination efficiency significantly deteriorates.

Besides, when a foam such as SDF and UDF is used or Supergel is used, a large amount of secondary waste water is generated during a process of removing a residue in the contaminated surface after treatment (specifically, according to an EPA report, an amount of radioactive waste generated from an EAI superGel=5 to 10 L/m$^2$; an amount of radioactive waste generated from SDF or UDF=40 L/m$^2$).

Further, when a strippable coating agent such as DeconGel, or Supergel is used, it is inconvenient to apply them to the contaminated surface during the application on the contaminated surface because an applied with paint brush method and an applied by trowel (paint scraper) method should be used.

Therefore, there is a need for developing a decontamination technology which is easily applied to the contaminated surface while significantly decreasing the amount of secondary waste water generated.

Recently, the present inventors have successfully developed an adsorbent/hydrogel based on an alginate in order to remove a radionuclide from the contaminated surface while reducing the amount of secondary waste water generated, but the adsorbent/hydrogel also has two disadvantages. The adsorbent/hydrogel has a first disadvantage in that calcium ions should be necessarily added in order to achieve cross-linking using an adsorbent/hydrogel based on an alginate and a second disadvantage in that a toxic additive referred to as ethylenediaminetetraacetic acid (EDTA) should be necessarily used in order to disintegrate the cross-linking after the adsorbent/hydrogel is used.

SUMMARY OF THE INVENTION

The present invention has been made in an effort to provide a composition for removing a radionuclide, including: a first polymer including a hydroxy group; a second polymer into which a boronic acid group is introduced as a functional group; and an adsorbent for removing the radionuclide, and the like.

However, technical problems to be achieved by the present invention are not limited to the aforementioned problems, and other problems that are not mentioned may be clearly understood by a person skilled in the art from the following description.

The present invention provides a composition for removing a radionuclide, including: a first polymer including a hydroxy group; a second polymer into which a boronic acid group is introduced as a functional group; and an adsorbent for removing the radionuclide.

An exemplary embodiment of the present invention provides a method for removing a radionuclide, the method including: (a) preparing a first solution containing a first polymer including a hydroxy group; (b) preparing a second solution containing a second polymer into which a boronic acid group is introduced as a functional group; and (c) forming a hydrogel for adsorbing the radionuclide by spraying or applying each of the first solution and the second solution onto a radionuclide-contaminated surface, and then cross-linking the first polymer and the second polymer to each other, in which an adsorbent for removing the radionuclide is further contained in the first solution or the second solution.

A composition for removing a radionuclide according to the present invention includes: a first polymer including a hydroxy group; a second polymer into which a boronic acid group is introduced as a functional group; and an adsorbent for removing the radionuclide, so that when the composition is applied to a radionuclide-contaminated surface, the first polymer and the second polymer can be reversibly cross-linked to each other to form a hydrogel. The hydrogel has advantages in that various radionuclides can be removed by dissolving the radionuclide present on the contaminated surface, and then transferring and encapsulating the radionuclide in the hydrogel, and the hydrogel can be easily peeled off from the contaminated surface due to excellent viscoelastic properties.

Further, since the cross-linking of the hydrogel can be disintegrated without using a toxic additive, the composition has advantages in that subsequently, the adsorbent for removing the radionuclide can be easily separated and recovered through a filter or a centrifuge, and the remaining solution can be treated or recycled as general waste, so that it is possible to significantly reduce an amount of the final generated organic radioactive waste.

Meanwhile, when a magnetic adsorbent is introduced as the adsorbent for removing the radionuclide, the adsorbent for removing the radionuclide adsorbs the radionuclide, and then the adsorbent can be magnetically separated and recovered through an external magnet, apart from the first and second polymers, so that the magnetic adsorbent can be easily recovered from a contaminated site without a need for a separate external apparatus such as a filter or a centrifuge. In particular, the remaining solution can be recycled at the contaminated site.

Further, when the second polymer includes a carboxyl group or a carbonyl group as a functional group, the functional group can have an advantage in that various positively charged radionuclides (for example: cesium, cobalt, strontium, and the like) can be additionally adsorbed. In addition, the carboxyl functional group can be additionally cross-linked (specifically, chelating bond) to a monovalent, divalent or trivalent ion ($Ag^+$, $Ca^{2+}$, $Fe^{2+}$, $Co^{2+}$, $Cu^{2+}$, $Fe^{3+}$, and the like), and as a result, excellent viscoelastic properties can be further improved through double cross-linking. Therefore, when a monovalent, divalent or trivalent ion solution is sprayed before or after the hydrogel is removed from a contaminated surface, the hydrogel has an advantage in that the hydrogel can be more easily peeled off from the contaminated surface.

According to the present invention, it is possible to efficiently cope with the restoration of not only various contaminated surfaces of nuclear power facilities contaminated with a radionuclide, but also roads, building surfaces, and the like in a residential area widely contaminated with radionuclides during a serious accident.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
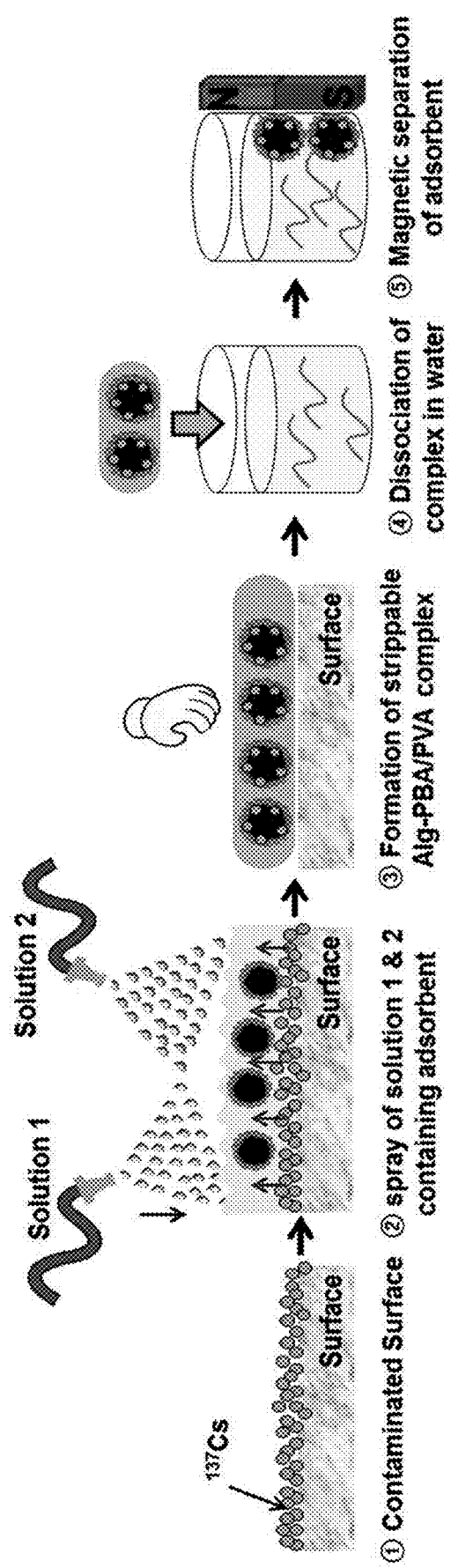
FIG. 1 is a schematic view illustrating a method for removing a radionuclide from a contaminated surface according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present inventors confirmed that a hydrogel in which a radionuclide is adsorbed could be formed by preparing a first solution containing a first polymer including a hydroxy group, preparing a second solution containing a second polymer into which a boronic acid group is introduced as a functional group, spraying or applying each of the first solution and the second solution onto a radionuclide-contaminated surface, and as a result, the radionuclide could be effectively removed, thereby completing the present invention.

Hereinafter, the present invention will be described in detail.

Composition for Removing Radionuclide

The present invention provides a composition for removing a radionuclide, including: a first polymer including a hydroxy group; a second polymer into which a boronic acid group is introduced as a functional group; and an adsorbent for removing the radionuclide.

First, the composition for removing the radionuclide according to the present invention includes a first polymer including a hydroxy group, and the hydroxy group corresponds to a functional group capable of being subjected to a dehydration condensation reaction with a boronic acid group in an anionic state.

Specifically, the first polymer includes a hydroxy group, and the hydroxy group corresponds to a functional group capable of being cross-linked (borate-ester bond) via a dehydration condensation reaction with a boronic acid group in a second polymer to be described below. Specifically, the hydroxy group is preferably one or more selected from the group consisting of polyvinyl alcohol, arabic gum, guar gum, locust bean gum, and a derivative thereof, more preferably polyvinyl alcohol, but is not limited thereto. Besides, the first polymer may include a diol group, or may include a catechol group, or may include a salicylhydroxamic acid group.

Furthermore, it is preferred that the first polymer is present in an amount of 1 part by weight to 20 parts by weight based on 100 parts by weight of the composition for removing the radionuclide, but the content is not limited thereto. In this case, the first polymer and the second polymer may be effectively cross-linked to each other by maintaining the content of the first polymer within the above range.

Next, the composition for removing the radionuclide according to the present invention includes a second polymer into which a boronic acid group is introduced as a functional group, and specifically, the boronic acid group may be introduced, as a functional group, at an end or into the inside of the second polymer. The boronic acid group refers to —$B(OH)_2$, and the boronic acid group corresponds to a functional group capable of being cross-linked (borate-ester bond) via a dehydration condensation reaction with a hydroxy group in an anionic state.

Specifically, in order to maintain the boronic acid group in an anionic state, the content and pH thereof need to be controlled. In this case, the pH is preferably 5 to 12, but is not limited thereto. The pH range may be adjusted according to the type of second polymer.

Further, the second polymer may include a skeleton with various functional groups, and as an example, when a carboxyl group or a carbonyl group is included in the skeleton, the carboxyl group or the carbonyl group may have an advantage in that the carboxyl group or the carbonyl group in an anionic state may additionally adsorb a positively charged nuclide. In addition, the carboxyl group can be additionally cross-linked (specifically, chelating bond) to a monovalent, divalent or trivalent ion ($Ag^+$, $Ca^{2+}$, $Fe^{2+}$, $Co^{2+}$, $Cu^{2+}$, $Fe^{3+}$, and the like), and as a result, excellent viscoelastic properties may be further improved through double cross-linking.

In this case, as an example in which a carboxyl group is included in the skeleton of the second polymer, one or more selected from the group consisting of an alginate, poly(succinimide), poly(methyl vinyl ether-alt-maleic anhydride), and polyacrylic acid are preferred, but the example is not limited thereto.

According to the specific type of the second polymer, the swelling ratio of the hydrogel and the ease point during spraying of the polymer solution may vary. For example, as the number of the carboxyl groups in the skeleton of the second polymer is increased, the swelling ratio of the hydrogel is improved, so that the composition for removing the nuclide has an advantage in that it is possible to add a larger amount of an ion exchanger capable of exchanging ions with a radionuclide because an ability to absorb as much as water is improved. In addition, the composition for removing the nuclide has an advantage in that a polymer solution is easily sprayed. Accordingly, the case of using one or more selected from the group consisting of poly(succinimide), poly(methyl vinyl ether-alt-maleic anhydride), and polyacrylic acid as the second polymer is advantageous in terms of the swelling ratio and the ease point during spraying of the polymer solution as compared to the case of using an alginate, which is bulky and highly viscous, as the second polymer.

In particular, when two or more carboxyl groups are included adjacent to each other in the skeleton of the second polymer, the composition for removing a radionuclide has an advantage in that additional cross-linking (specifically, chelating bond) to a monovalent, divalent or trivalent ion ($Ag^+$, $Ca^{2+}$, $Fe^{2+}$, $Co^{2+}$, $Cu^{2+}$, $Fe^{3+}$ and the like) can be more stably formed. In this case, by maintaining a pH of the second solution containing the second polymer at 8 to 11, the boronic acid group may be maintained in an anionic state.

In this case, as an example in which a carbonyl group is included in the skeleton of the second polymer, one or more selected from the group consisting of polyacrylamide, N,N-dimethylacrylamide, and polyvinylpyrrolidone are preferred, but the example is not limited thereto. In this case, by maintaining a pH of the second solution containing the second polymer at 5 to 7, the boronic acid group may be maintained in an anionic state.

Furthermore, it is preferred that the second polymer is present in an amount of 1 part by weight to 20 parts by weight based on 100 parts by weight of the composition for removing the radionuclide, but the content is not limited thereto. In this case, the first polymer and the second polymer may be effectively cross-linked to each other by maintaining the content of the second polymer within the above range.

Next, the composition for removing the radionuclide according to the present invention includes an adsorbent for removing a radionuclide.

The adsorbent for removing the radionuclide is for enhancing radionuclide removal performance, and any adsorbent for removing the radionuclide can be applied as long as it is publicly known. In particular, by using an adsorbent having an excellent partition coefficient with respect to the radionuclide as the adsorbent for removing the radionuclide, radionuclide removal performance may be improved.

Specifically, as the adsorbent for removing radioactive cesium, metal ion-ferrocyanide, zeolite, tetraphenylborate, ammonium phosphomolybdate, and the like may be used, and as an adsorbent for removing radioactive strontium, ferrous hydroxide, calcium or iron phosphate, calcium carbonate, hydroxyapatite, manganese dioxide, barium sulfate, and the like may be used. In addition, it is possible to use various adsorbents for removing a radionuclide such as Pu, Am, Cr-51, Mn-54, Co, Fe-59, Sb, Ru, Zr, Nb, and Ce.

Furthermore, the adsorbent for removing the radionuclide may include a magnetic adsorbent. The adsorbent for removing the radionuclide may be separated and recovered by typically using a filter or a centrifuge. In addition, when a magnetic adsorbent is included as the adsorbent for removing the radionuclide, by applying an external magnet without any need for a separate external apparatus such as a filter or a centrifuge, selective magnetic separation and recovery are possible.

Further, it is preferred that the adsorbent for removing the radionuclide is present in an amount of 0.1 part by weight to 10 parts by weight based on 100 parts by weight of the composition for removing the radionuclide, but the content is not limited thereto. In this case, when a content of the adsorbent for removing the radionuclide is less than the aforementioned content, there is a problem in that radionuclide removal performance deteriorates, and when a content of the adsorbent for removing the radionuclide is more than the aforementioned content, there is a problem in that diol-borate cross-linking is not properly achieved in a hydrogel in which radioactive cesium is adsorbed.

Optionally, the composition for removing the radionuclide according to the present invention may include a monovalent, divalent or trivalent ion for being additionally cross-linked to the second polymer.

The monovalent, divalent or trivalent ion is for being additionally cross-linked (specifically, chelating bond) to the second polymer, particularly, a carboxyl group in the second polymer, and may further improve excellent viscoelastic properties. Specific examples of the monovalent, divalent or trivalent ion include $Ag^+$, $Ca^{2+}$, $Fe^{2+}$, $Co^{2+}$, $Cu^{2+}$, $Fe^{3+}$, and the like.

Optionally, the composition for removing the radionuclide according to the present invention may additionally include an ion exchanger capable of exchanging ions with the radionuclide.

Specifically, the ion exchanger may include an ammonium ion, a potassium ion, a sodium ion, a rubidium ion, or a non-radioactive nuclide (cesium, and the like) The ion exchanger serves to further improve radionuclide removal performance by additionally exchanging ions with the radionuclide (cesium, and the like) present on a contaminated surface.

Method for Removing Radionuclide from Contaminated Surface

The present invention provides a method for removing a radionuclide, the method including: (a) preparing a first solution containing a first polymer including a hydroxy group; (b) preparing a second solution containing a second polymer into which a boronic acid group is introduced as a functional group; and (c) forming a hydrogel in which the radionuclide is adsorbed by spraying or applying each of the first solution and the second solution onto a radionuclide-contaminated surface, and then cross-linking the first polymer and the second polymer to each other, in which an adsorbent for removing the radionuclide is further contained in the first solution or the second solution.

(d-1) after the hydrogel in which the radionuclide is adsorbed is immersed in water, only the hydrogel may be selectively dissolved, or (d-2) after a pH of the hydrogel in which the radionuclide is adsorbed is adjusted to 4 or less, only the hydrogel may be selectively dissolved.

First, the method for removing the radionuclide according to the present invention includes preparing a first solution containing a first polymer including a hydroxy group [step (a)].

Since the first polymer including the hydroxy group is as described above, an overlapping description thereof will be omitted.

Next, the method for removing the radionuclide according to the present invention includes preparing a second solution containing a second polymer into which a boronic acid group is introduced as a functional group [step (b)].

Since the second polymer into which the boronic acid group is introduced as a functional group is as described above, an overlapping description thereof will be omitted.

The first solution or the second solution is characterized by additionally containing an adsorbent for removing a radionuclide, and optionally, radionuclide removal performance may be further improved by additionally including an ion exchanger capable of exchanging ions with the radionuclide.

Next, the method for removing the radionuclide according to the present invention includes forming a hydrogel in which the radionuclide is adsorbed by spraying or applying each of the first solution and the second solution onto a radionuclide-contaminated surface, and then cross-linking the first polymer and the second polymer to each other [step (c)].

The first solution and the second solution maintains a state where the two solutions are separated from each other before being sprayed or applied onto a radionuclide-contaminated surface, and then the first polymer and the second polymer may be reversibly cross-linked to each other through spraying or application.

The cross-linking may be achieved via a dehydration condensation reaction between the first polymer and the second polymer, and specifically, the cross-linking may be achieved via a dehydration condensation reaction between a hydroxy group in the first polymer and a boronic acid group in an anionic state in the second polymer. It is preferred that the dehydration condensation reaction is carried out under a pH condition of 5 to 12, such that the boronic acid group can maintain its anionic state, but the pH condition is not limited thereto. The pH range may be adjusted according to the type of second polymer.

After the hydrogel in which the radionuclide is adsorbed is formed, a monovalent, divalent or trivalent ion solution for being cross-linked to the second polymer may be further sprayed before or after the hydrogel is removed from a contaminated surface. As such, the method may have an advantage in that the hydrogel can be more easily peeled off from the contaminated surface, and has an advantage in that the hydrogel can be recycled without using a toxic additive.

The hydrogel in which the radionuclide is adsorbed is characterized by having a high viscoelasticity, it is preferred that at a frequency of 100 rad/s, the storage modulus is 2,000 Pa to 10,000 Pa and the loss modulus is 100 Pa to 5,000 Pa, it is more preferred that at a frequency of 100 rad/s, the storage modulus is 2,000 Pa to 10,000 Pa and the loss modulus is 100 Pa to 500 Pa, but the values are not limited thereto. Accordingly, since the hydrogel in which the radionuclide is adsorbed has a high storage modulus (particularly, as compared to the loss modulus), the method has an advantage in that the hydrogel can be easily peeled off from the contaminated surface.

Optionally, the method for removing the radionuclide according to the present invention may further include immersing the hydrogel in which the radionuclide is adsorbed, and then selectively dissolving only the hydrogel [step (d-1)].

Alternatively, the method for removing the radionuclide according to the present invention may further include adjusting a pH of the hydrogel in which the radionuclide is adsorbed to 4 or less, and then selectively dissolving only the hydrogel [step (d-2)].

Specifically, the selective dissolution may be performed by disintegrating the cross-linking between the first polymer and the second polymer, and the cross-linking is a reversible reaction and has an advantage in that the cross-linking may be disintegrated by adding an excessive amount of water without a separate additive. In this case, it is preferred that the hydrogel is immersed into water in an amount three times, preferably 5 times to 20 times as much as the amount of the hydrogel in which the radionuclide is adsorbed, but the amount is not limited thereto. Alternatively, the cross linkage may also be disintegrated by adjusting the pH to 4 or less.

Thereafter, an adsorbent for removing a radionuclide, in which the radionuclide is adsorbed may be separated and recovered through a filter, a centrifuge, or an external magnet.

Then, the remaining solution may be recycled. Specifically, in the case of including a skeleton including a carboxyl group as the second polymer, when a new adsorbent for removing a radionuclide is mixed with the remaining solution, the resulting solution is sprayed or applied onto a contaminated surface, and then a monovalent, divalent or trivalent ion ($Ag^+$, $Ca^{2+}$, $Fe^{2+}$, $Co^{2+}$, $Cu^{2+}$, $Fe^{3+}$, and the like) is added thereto, the hydrogel can be again formed by chelating bonding, and thus can be recycled. Particularly, in the case of using a second polymer based on an alginate as the second polymer, when a new adsorbent for removing a radionuclide is mixed with the remaining solution, the resulting solution is sprayed or applied onto a contaminated surface, and then $Ca^{2+}$ ions are added thereto, the hydrogel can be again formed by a cross-linking between the alginate and $Ca^{2+}$, and thus can be recycled.

As described above, the composition for removing the radionuclide according to the present invention includes: a first polymer including a hydroxy group; a second polymer into which a boronic acid group is introduced as a functional group; and an adsorbent for removing the radionuclide, so that when the composition is applied to a radionuclide-contaminated surface, the first polymer and the second polymer may be reversibly cross-linked to each other to form a hydrogel. The hydrogel has advantages in that various radionuclides may be removed by dissolving the radionuclide present on the contaminated surface, and then transferring and encapsulating the radionuclide in the hydrogel, and the hydrogel may be easily peeled off from the contaminated surface due to excellent viscoelastic properties.

Further, since the cross-linking of the hydrogel may be disintegrated without using a toxic additive, the composition has advantages in that subsequently, the adsorbent for removing the radionuclide may be easily separated and recovered through a filter or a centrifuge, and the remaining solution may be treated or recycled as general waste, so that it is possible to significantly reduce an amount of final generated organic radioactive waste.

Meanwhile, when a magnetic adsorbent is introduced as the adsorbent for removing the radionuclide, the adsorbent for removing the radionuclide adsorbs the radionuclide, and then the adsorbent may be magnetically separated and recovered through an external magnet through an external magnet, apart from the first and second polymers, so that the magnetic adsorbent may be easily recovered at a contaminated site without a need for a separate external apparatus such as a filter or a centrifuge. In particular, the remaining solution may be recycled at the contaminated site.

Further, when the second polymer includes a carboxyl group or a carbonyl group as a functional group, the functional group may have an advantage in that various positively charged radionuclides (for example: cesium, cobalt, strontium, and the like) may be additionally adsorbed. In addition, the carboxyl functional group can be additionally cross-linked (specifically, chelating bond) to a monovalent, divalent or trivalent ion ($Ag^+$, $Ca^{2+}$, $Fe^{2+}$, $Co^{2+}$, $Cu^{2+}$, $Fe^{3+}$, and the like), and as a result, excellent viscoelastic properties may be further improved through double cross-linking. Therefore, when a monovalent, divalent or trivalent ion solution is sprayed before or after the hydrogel is removed from a contaminated surface, the hydrogel has an advantage in that the hydrogel may be more easily peeled off from the contaminated surface.

According to the present invention, it is possible to efficiently cope with the restoration of not only various contaminated surfaces of nuclear power facilities contaminated with a radionuclide, but also roads, building surfaces, and the like in a residential area widely contaminated with radionuclides during a serious accident.

Hereinafter, preferred Examples for helping the understanding of the present invention will be suggested. However, the following Examples are provided only to more easily understand the present invention, and the contents of the present invention are not limited by the following Examples.

EXAMPLES

Example 1

Figure 2:
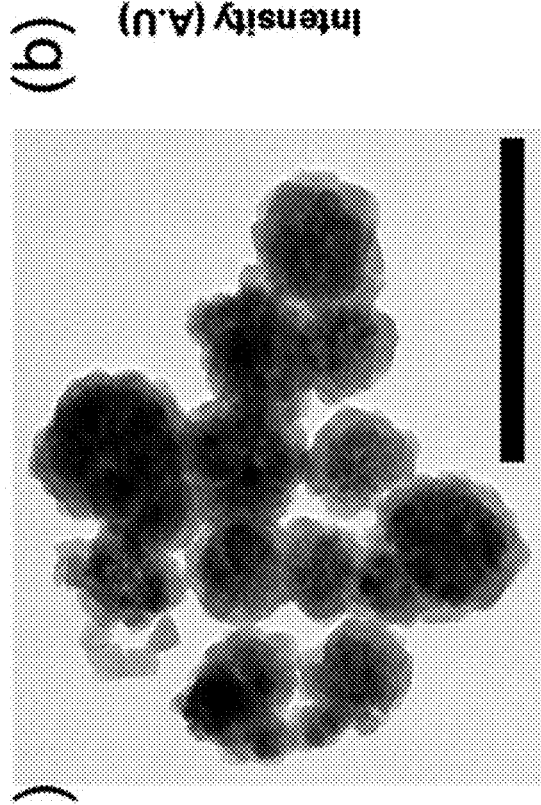
FIG. 2 is (a) a TEM photograph (scale: 500 nm) of a magnetic adsorbent coated with Prussian blue used in Example 1, (b) an XRD pattern graph (red: $Fe_3O_4$, blue: Prussian blue) and (c) a magnetization curve graph measured using a vibrating sample magnetometer.
Figure 2:
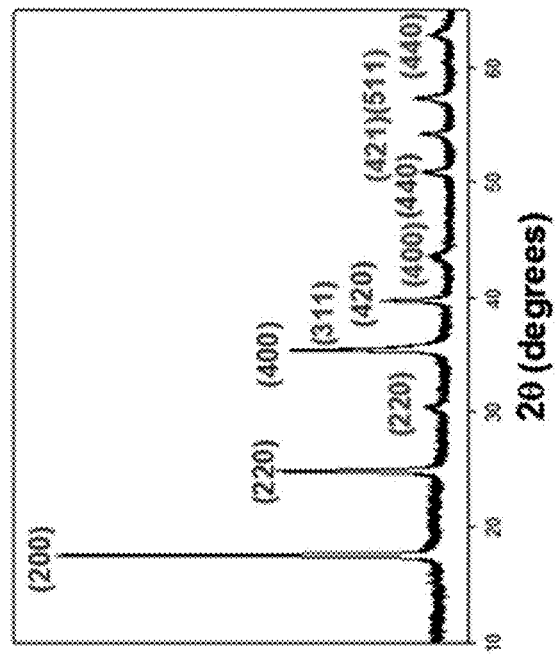
Figure 2:
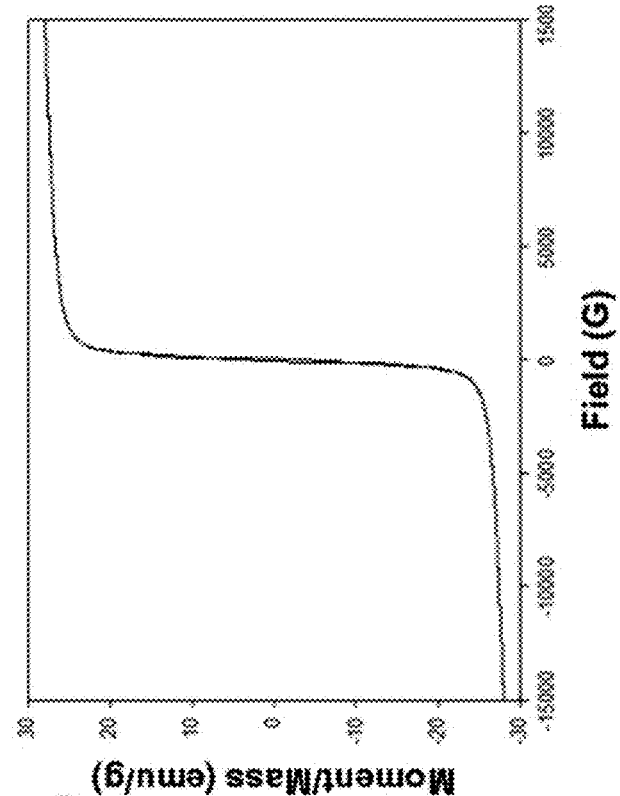

An aqueous solution (a first solution) including 8 wt % of polyvinyl alcohol as a first polymer and 0.5 wt % of a magnetic adsorbent (see FIG. 2) coated with Prussian blue as an adsorbent for removing radioactive cesium was prepared.

Figure 3A:
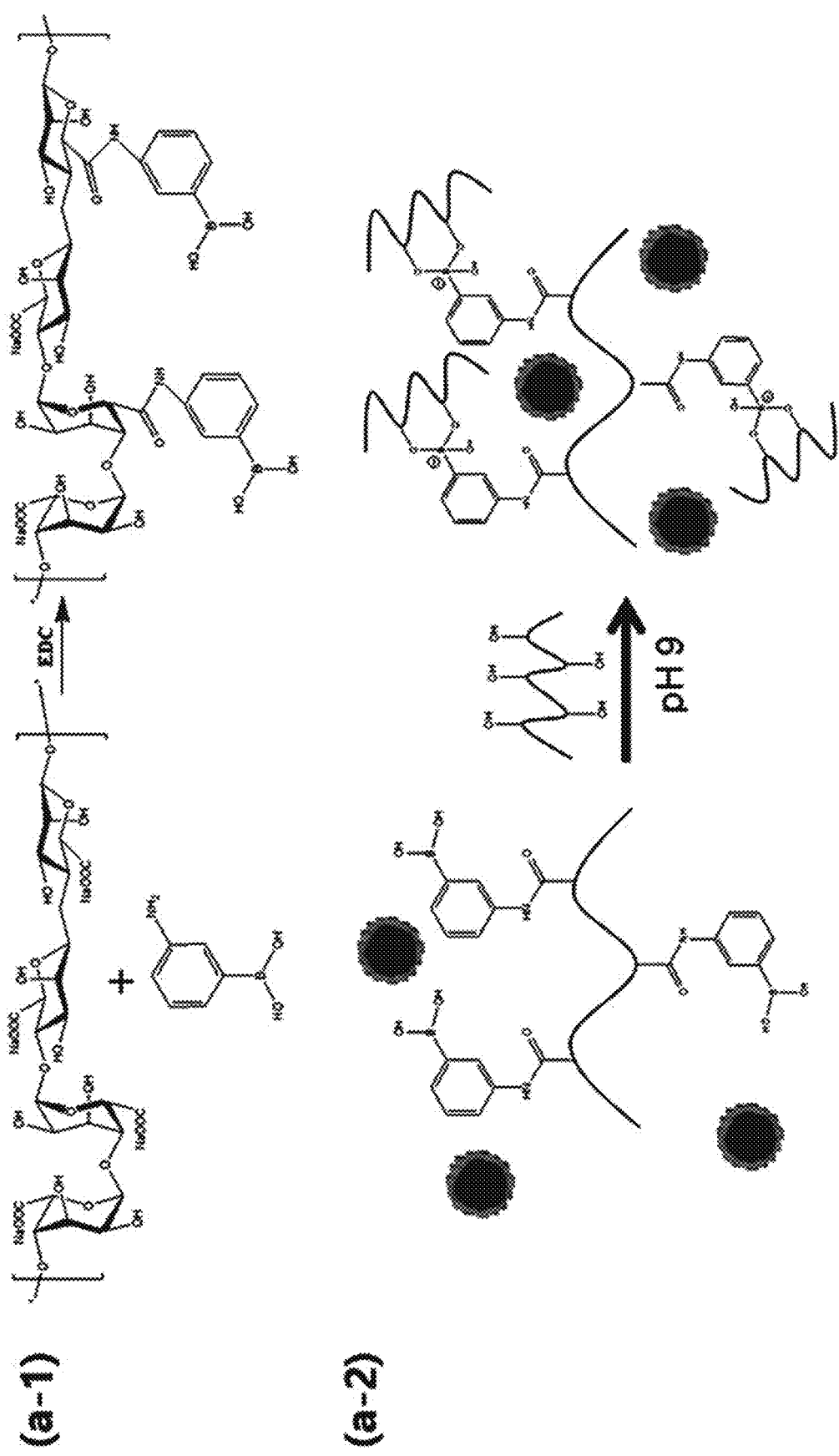
FIG. 3A is a view (a-1) illustrating a process of synthesizing a second polymer based on an alginate, into which a boronic acid group is introduced, and prepared in Example 1; and a view (a-2) illustrating an aspect in which when a first solution containing a first polymer including a hydroxy group and a second solution containing a second polymer based on an alginate, into which a boronic acid group is introduced, and prepared in Example 1 and an adsorbent for removing radioactive cesium are mixed, the two polymers are cross-linked (a borate-ester bond) to each other to form a hydrogel, and the adsorbent for removing radioactive cesium is physically encapsulated therein.
Figure 3B:
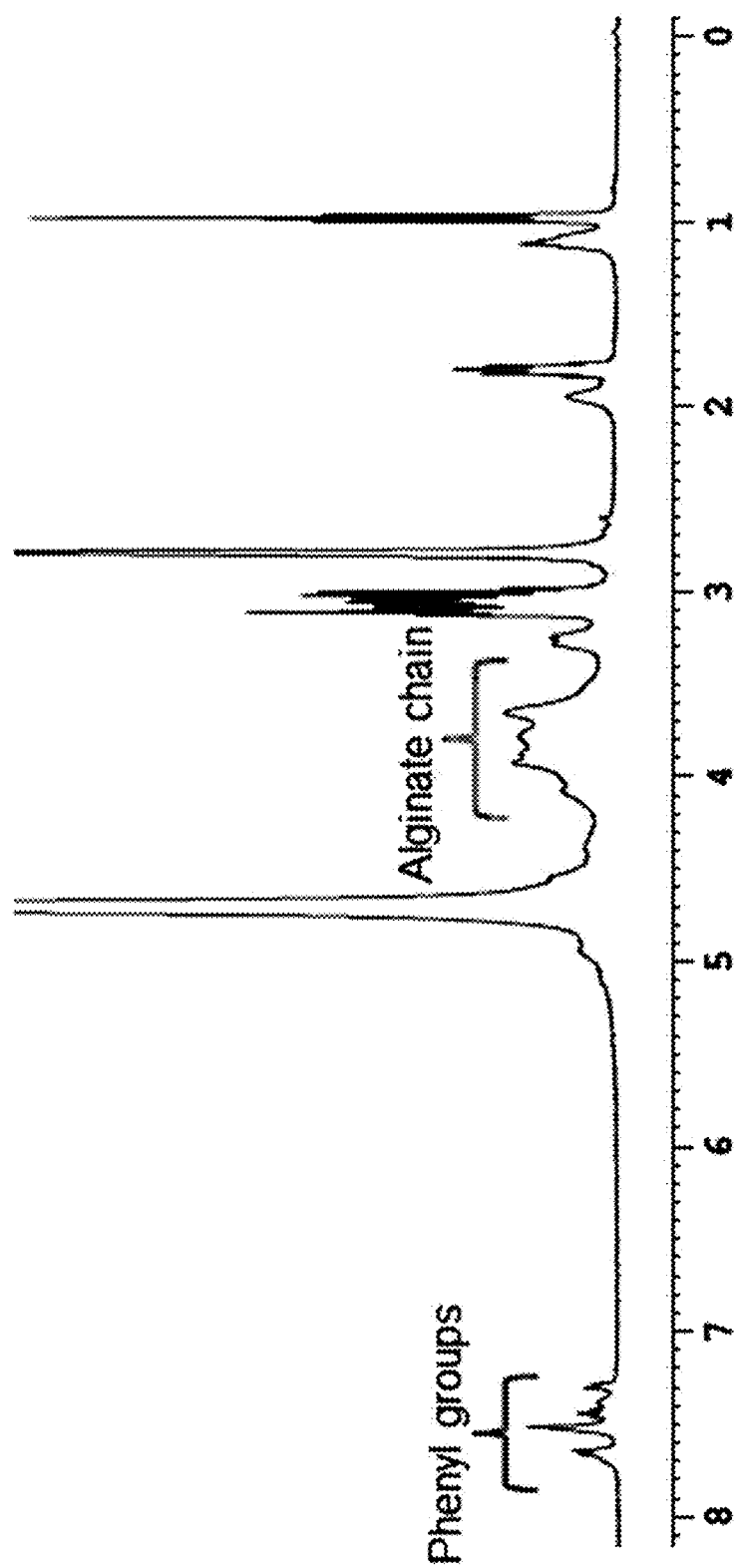
FIG. 3B is a graph illustrating a result in which a second polymer (FIG. 3A (a-1)) based on an alginate, into which a boronic acid group is introduced, and prepared in Example 1, is analyzed through NMR.

After 1 g of sodium alginate (Sigma Aldrich, Product No. 180947)(viscosity=15 to 25 cP in 1% $H_2O$), 0.96 g of 1-(3-dimethylaminopropyl)-3-ethylcarbodimide hydrochloride, and 0.39 g of 3-aminophenylboronic acid were dissolved in 100 mL of water, the resulting solution was reacted for 24 hours. Thereafter, a second polymer was prepared by removing an unreacted reactant through dialysis (see FIG. 3A), and the result was analyzed through NMR (see FIG. 3B). As illustrated in FIG. 3B, it was confirmed that phenylboronic acid was successfully introduced into the alginate skeleton. An aqueous solution (a second solution) (pH=8.5) including 2 wt % of the second polymer was prepared.

After a first solution and a second solution were sprayed onto a simulated radioactive cesium-contaminated surface (paint, aluminum, stainless steel, and cement) using a spray, the two solutions were left to stand for a predetermined time to form a hydrogel in which radioactive cesium was spontaneously adsorbed.

Then, 3 g of the hydrogel in which radioactive cesium was adsorbed was detached from the simulated contaminated surface. Thereafter, the radioactive cesium was removed by removing the residue.

Figure 4:
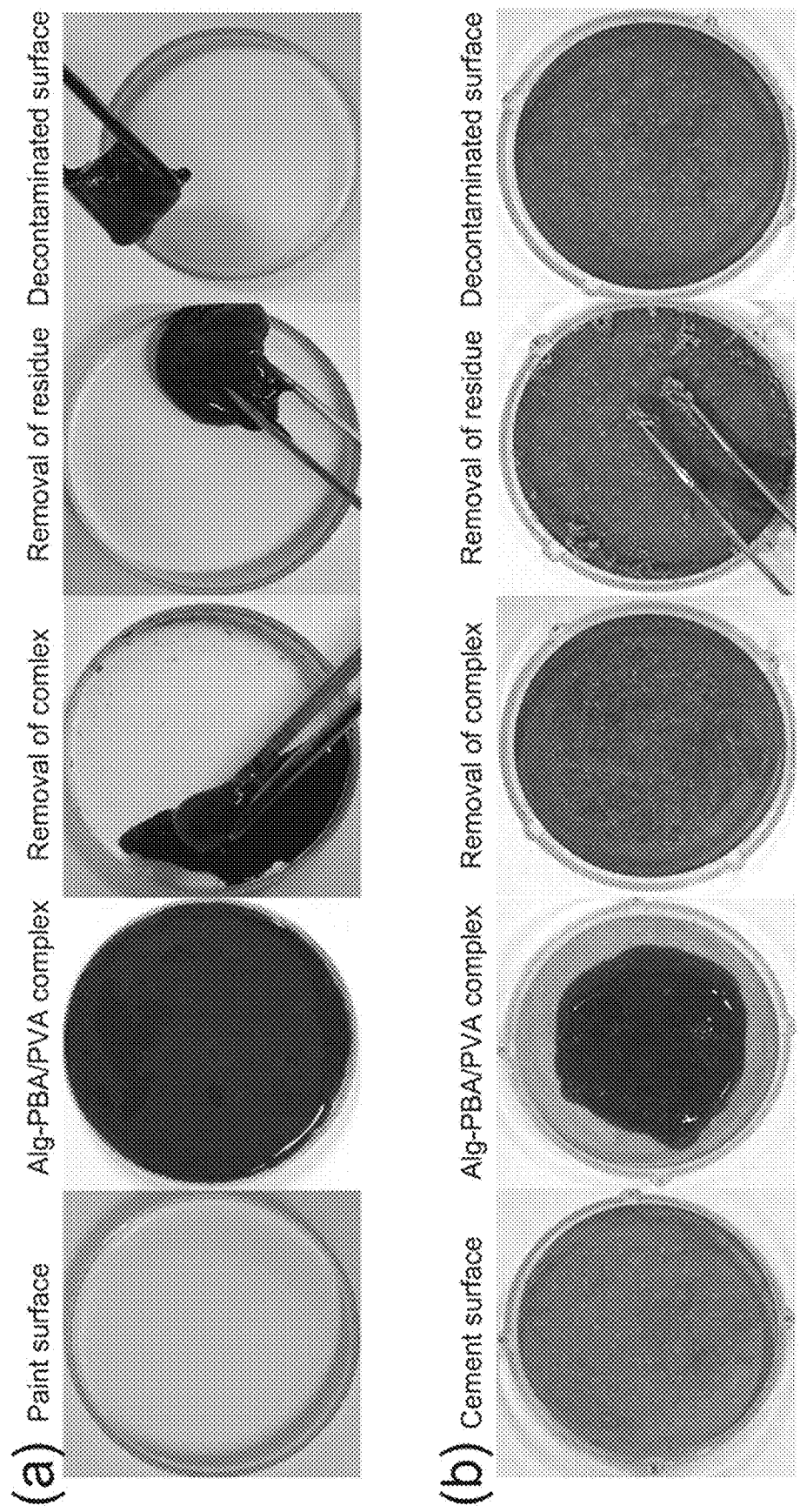
FIG. 4 is a photograph illustrating a process of forming a hydrogel in which radioactive cesium is adsorbed on a simulated contaminated surface (paint and cement) and detaching the hydrogel three hours later.

FIG. 4 is a photograph illustrating a process of forming a hydrogel in which radioactive cesium is adsorbed on a simulated contaminated surface (paint and cement) and detaching the hydrogel three hours later, and it is confirmed that the viscoelasticity of the hydrogel in which radioactive cesium was adsorbed is so excellent that the hydrogel could be easily removed from the simulated contaminated surface.

Figure 5:
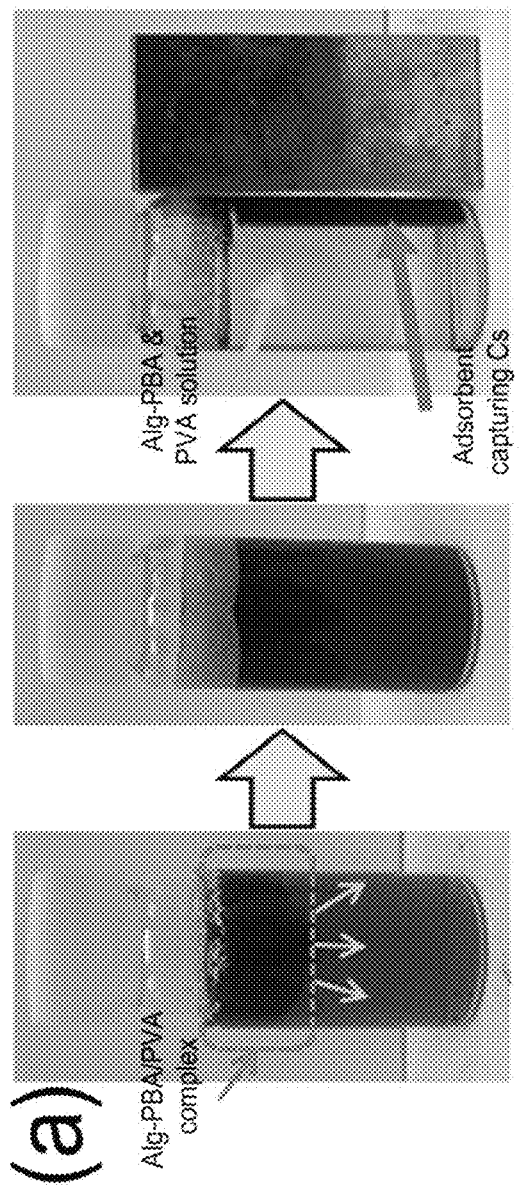
FIG. 5(a) is a photograph illustrating a process of applying an external magnet to an aqueous solution prepared by adding the hydrogel in which radioactive cesium is adsorbed, which is detached in Example 1, to distilled water, and (b) is a graph illustrating a result in which radioactivity is measured in an aqueous solution before and after magnetic separation by an external magnet.
Figure 5:
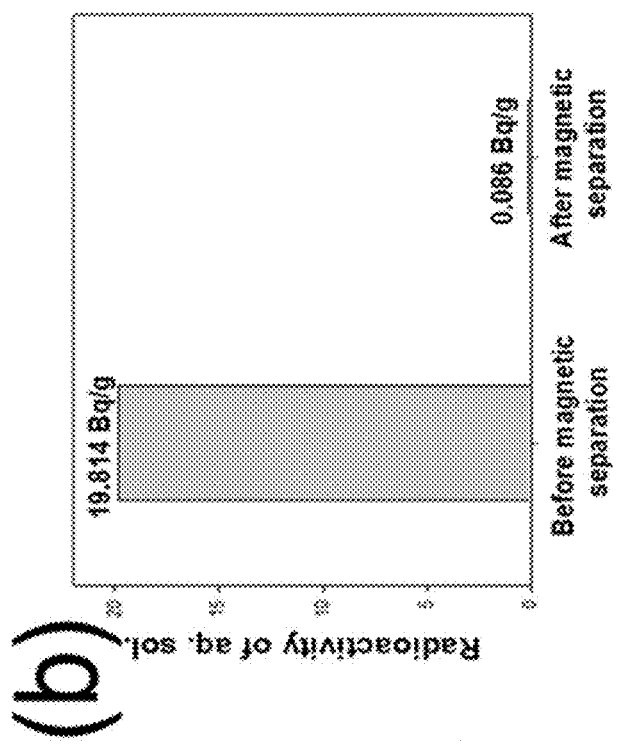

Next, only the hydrogel was selectively dissolved by detaching the hydrogel from the simulated contaminated surface and adding 20 g of the hydrogel in which radioactive cesium was adsorbed to 20 g of distilled water in a beaker to disintegrate the cross-linking. Next, only the adsorbent coated with Prussian blue, in which radioactive cesium was adsorbed, was selectively subjected to magnetic separation by positioning an external magnet on the external wall of the beaker (see FIG. 5(a)), and the results of measuring radioactivity in the aqueous solution before and after the magnetic separation by the external magnet are illustrated in FIG. 5(b). In this case, the first polymer and the second polymer were recycled by diluting the remaining solution.

As illustrated in FIG. 5(a), it is confirmed that as the diol-borate cross-linking was successfully disintegrated in the hydrogel in which radioactive cesium was adsorbed by adding distilled water, and as a result, the hydrogel was dissolved, the magnetic adsorbent coated with Prussian blue present in the hydrogel was slowly released toward the aqueous solution, and the aqueous solution turned blue. Thereafter, it is confirmed that as the magnetic adsorbent coated with the Prussian blue adsorbing radioactive cesium was separated toward the side where the external magnet was positioned by introducing the external magnet, the aqueous solution became clear again.

Finally, the radioactive cesium present on the contaminated surface was adsorbed onto the magnetic adsorbent coated with Prussian blue, and about 100% of the radioactive cesium was recovered by the external magnet and removed. In this case, it is confirmed that about 99.5% or more of the finally removed radioactive cesium (19.814 Bq/g→0.086 Bq/g) was adsorbed onto the magnetic adsorbent coated with Prussian blue (FIG. 5(b)), and through the result, it is confirmed that the residual amount of radioactive cesium remaining in the aqueous solution was 0.086 Bq/g, corresponding to 0.1 Bq/g or less, which satisfies the self-disposal criteria. Therefore, the first polymer and the second polymer may be recycled.

Meanwhile, in order to understand rheological properties of a hydrogel in which radioactive cesium is adsorbed according to an exemplary embodiment of the present invention, a hydrogel was formed by adjusting the contents of the first polymer and the adsorbent for removing radioactive cesium in the first solution and a content of the second polymer in the second solution as in the following Table 1, mixing the first solution and the second solution, and then treating the resulting mixture for about 120 minutes and drying the mixture, and measurement results of the storage modulus (G') and loss modulus (G") of the hydrogel according to angular frequency are shown in Table 1 and FIG. 6(a-d).

TABLE 1

| | First solution | | Second solution | | |
|---|---|---|---|---|---|
| | Content of first polymer | Adsorbent for removing radioactive cesium | Content of second polymer | Storage modulus | Loss modulus |
| (a) | 4 wt % | 0 wt % | 0.8 wt % | 3935 | 1551 |
| (b) | 4 wt % | 0.5 wt % | 0.8 wt % | 2607 | 932 |
| (c) | 4 wt % | 0 wt % | 1 wt % | 3359 | 1299 |
| (d) | 4 wt % | 0.5 wt % | 1 wt % | 2112 | 840 |

Figure 6:
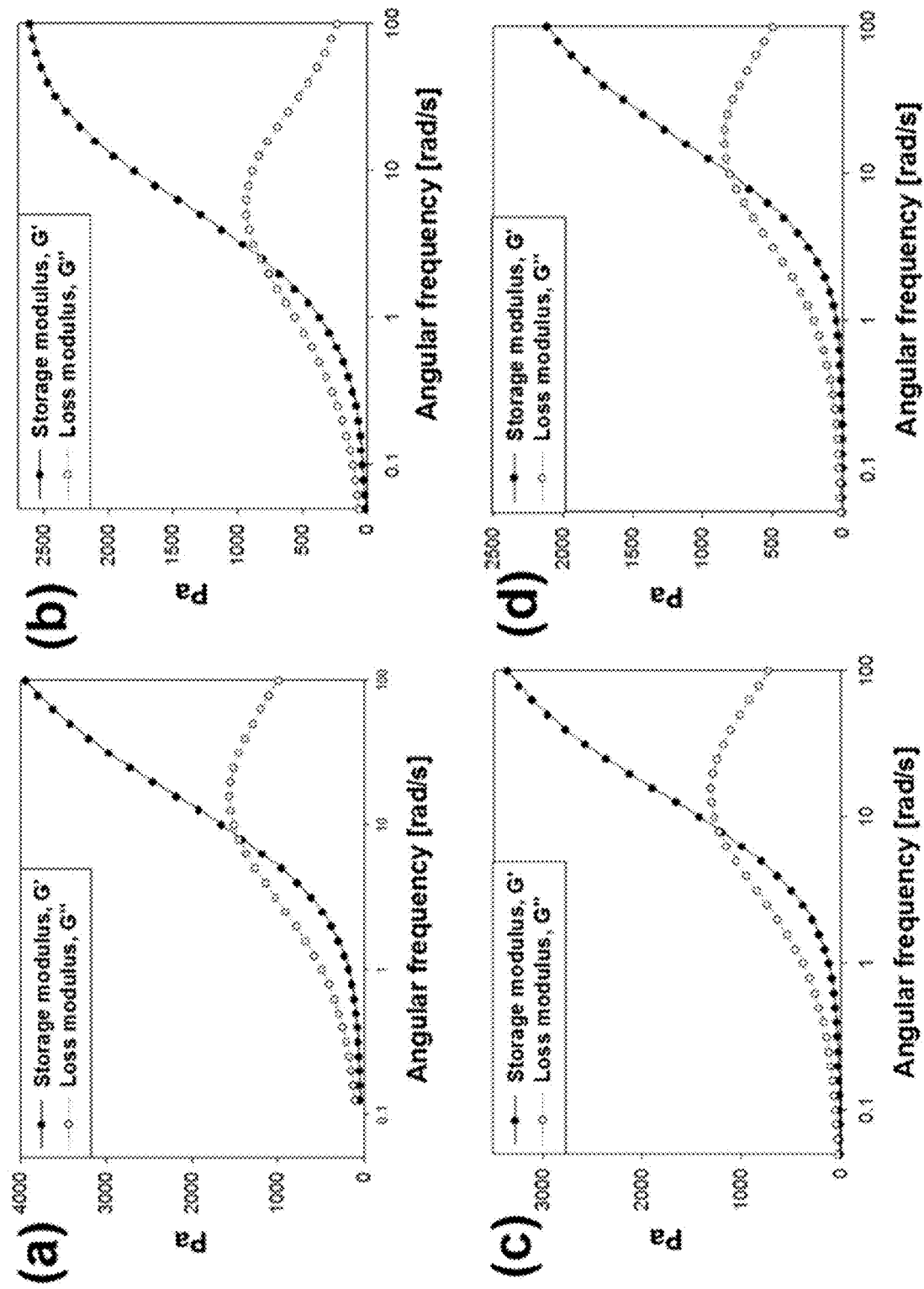
FIG. 6 includes graphs illustrating measurement results of the storage modulus (G') and loss modulus (G") according to angular frequency of a hydrogel formed by adjusting the contents of the first polymer and the adsorbent for removing radioactive cesium in the first solution and a content of the second polymer in the second solution, mixing the first solution and the second solution, and then treating the resulting mixture for about 120 minutes and drying the mixture, in order to understand the rheological properties of a hydrogel in which radioactive cesium is adsorbed according to an exemplary embodiment of the present invention.

As shown in Table 1 and FIG. 6(a-d), it is confirmed that the smaller the content of the second polymer in the second solution was, the larger the storage modulus and loss modulus values were, and the composition according to the present invention has an advantage in that the hydrogel was easily removed from a simulated contaminated surface. However, when an adsorbent for removing radioactive cesium is included in a first solution, it is confirmed that the storage modulus and loss modulus values are decreased.

Example 2

First, poly(succinimide) was synthesized by the following method. After 40 g of L-aspartic acid was dissolved in 200 mL of sulfolane, 15 mmol of phosphoric acid was added thereto, and then the resulting mixture was stirred at 170° C. under a $N_2$ atmosphere for 10 hours. Water produced during stirring of the mixture was removed using a Dean-stark trap. Next, a synthesized product was collected by precipitating the aforementioned product in an excessive amount of methanol, the synthesized product was dispersed in water, precipitation and dispersion was repeated until the pH of the aqueous solution became neutral, and then poly(succinimide) was finally synthesized by drying the aqueous solution.

Figure 7:
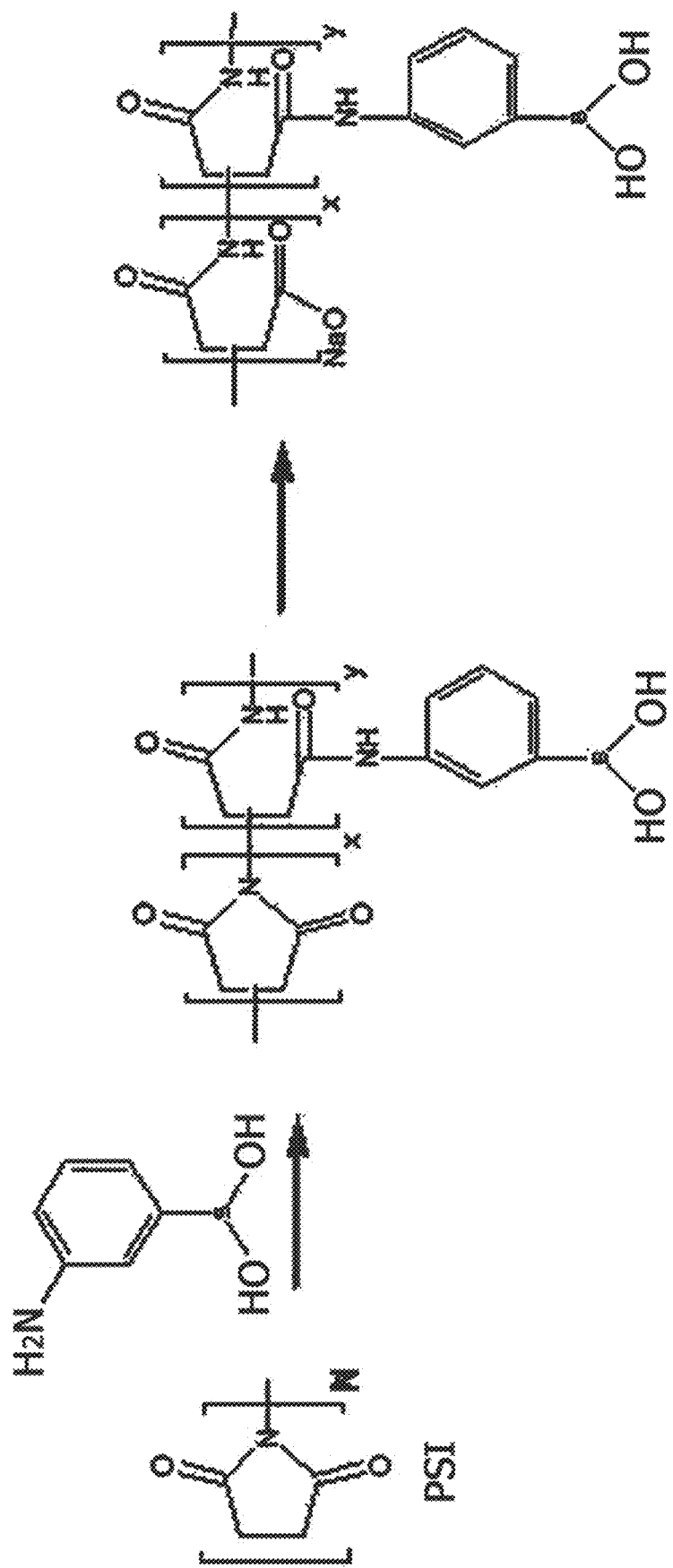
FIG. 7 is a view illustrating a process of synthesizing a second polymer based on poly(succinimide), into which a boronic acid group is introduced, and prepared in Example 2.

Next, after 0.97 g of the finally synthesized poly(succinimide) and 0.4 g of 3-aminophenylboronic acid were dissolved in 100 mL of dimethyl sulfoxide, the resulting solution was reacted for 24 hours. Thereafter, a second polymer was prepared by removing an unreacted reactant through dialysis (see FIG. 7). The radioactive cesium was removed in the same manner as in Example 1, except that an aqueous solution (second solution)(pH 8.5) including 2 wt % of the second polymer was prepared.

Example 3

Figure 8:
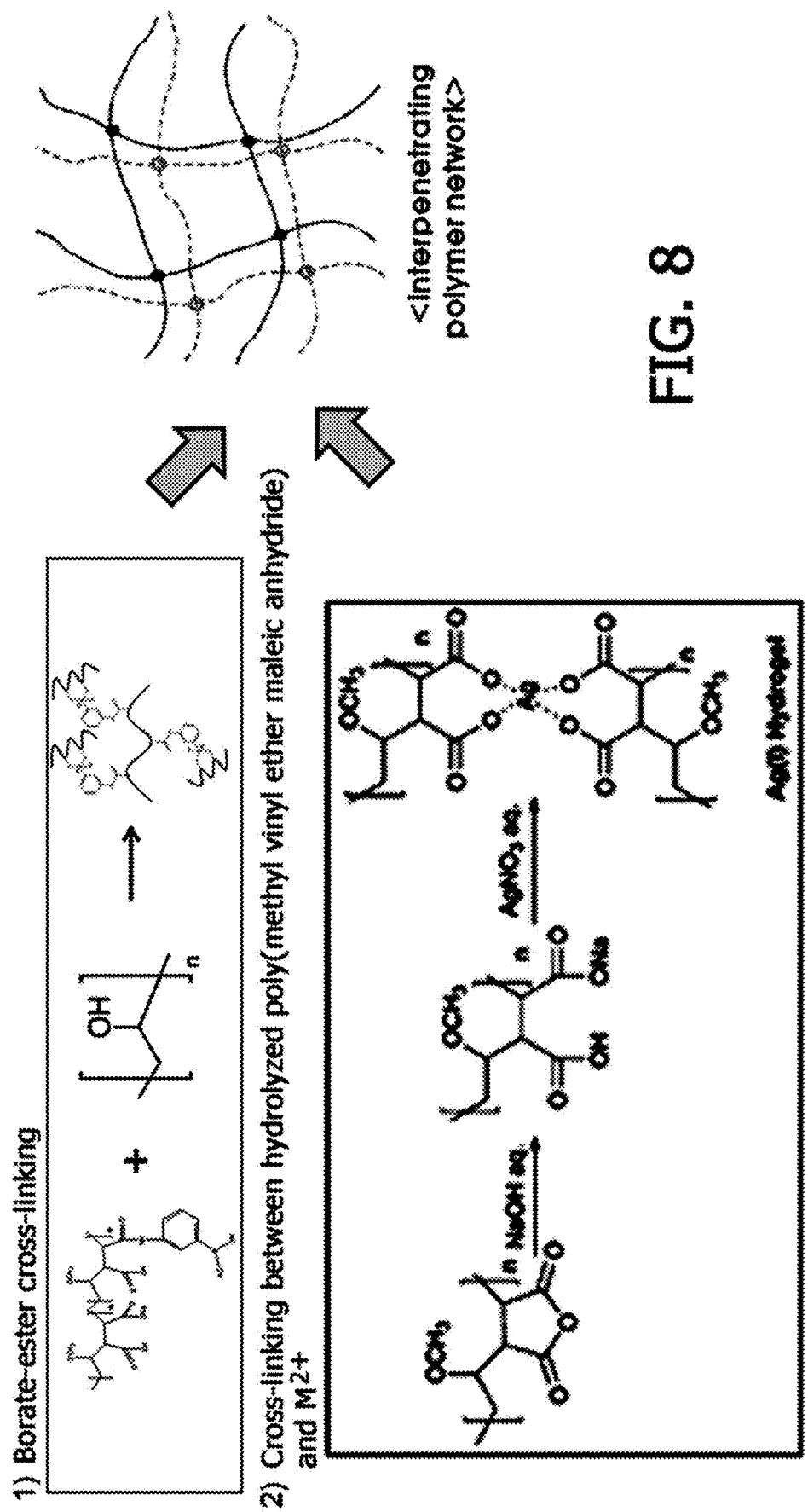
FIG. 8 is a view illustrating a process of synthesizing a second polymer based on poly(methyl vinyl ether-alt-maleic anhydride), into which a boronic acid group is introduced, the second polymer prepared in Example 3.

After 1 g of poly(methyl vinyl ether-alt-maleic anhydride) (Sigma Aldrich, Product No. 416320)(Mw=1,080,000) and 0.3 g of 3-aminophenylboronic acid were dissolved in 100 mL of water, the resulting solution was reacted for 24 hours. Thereafter, a second polymer was prepared by removing an unreacted reactant through dialysis (see FIG. 8). The radioactive cesium was removed in the same manner as in Example 1, except that an aqueous solution (second solution)(pH 8.5) including 2 wt % of the second polymer was prepared.

Example 4

Figure 9:
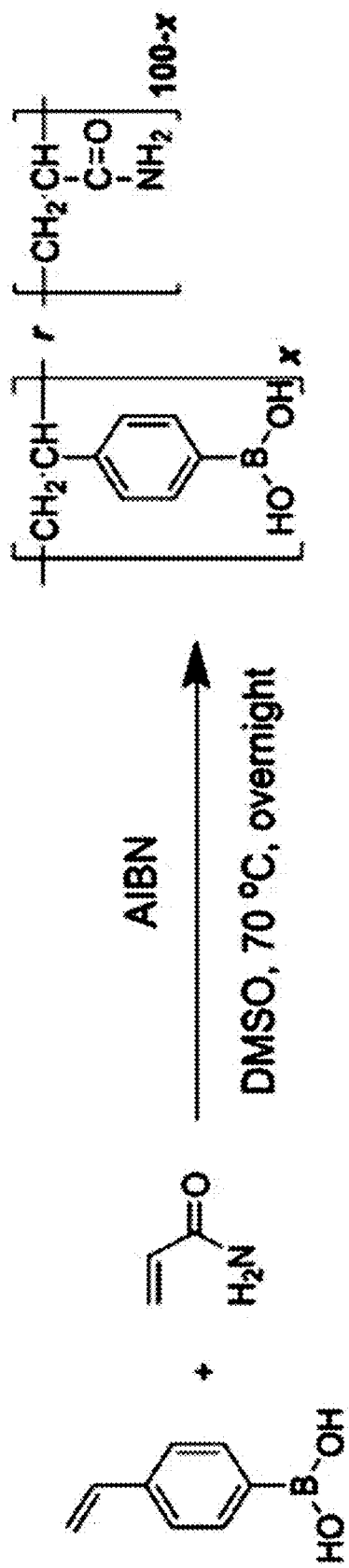
FIG. 9 is a view illustrating a process of synthesizing a second polymer based on polyacrylamide, into which a boronic acid group is introduced, and prepared in Example 4.

614 mg of acrylamide, 142 mg of 4-vinylphenylboronic acid, and 10 mg of 2,2'-azobisisobutyronitrile were dissolved in 6 mL of N,N'-dimethylformamide. Thereafter, after the resulting solution was purged with argon gas or nitrogen gas for 1 hour or more, the solution was stirred at 70° C. for 12 hours or more. Thereafter, a second polymer was prepared by removing an unreacted reactant through dialysis (see FIG. 9). The radioactive cesium was removed in the same manner as in Example 1, except that an aqueous solution (second solution)(pH 10) including 2 wt % of the second polymer was prepared.

Example 5

The radioactive cesium was removed in the same manner as in Example 4, except that N,N-dimethylacrylamide was used instead of acrylamide, and the pH of the second solution was adjusted to 7.5.

Comparative Example 1

Radioactive cesium was removed by spraying water onto a radioactive cesium-contaminated surface (paint, aluminum, stainless steel, and cement) using a sprayer.

Comparative Example 2

Radioactive cesium was removed by spraying 0.1 M NH$_4$Cl onto radioactive cesium-contaminated surface (paint, aluminum, stainless steel, and cement) using a spray.

Comparative Example 3

The same method as in Example 1 was carried out, except that as an adsorbent for removing radioactive cesium in the first solution, 0.5 wt % of a magnetic adsorbent coated with Prussian blue, which was prepared according to Example 1 of Korean Registered Patent No. 10-1658475, was eliminated.

Comparative Example 4

The same method as in Example 1 was carried out, except that as an adsorbent for removing radioactive cesium in the first solution, 0.1 NH$_4$Cl was used instead of 0.5 wt % of a magnetic adsorbent coated with Prussian blue, which was prepared according to Example 1 of Korean Registered Patent No. 10-1658475.

Comparative Example 5

Radioactive cesium was removed by treating a radioactive cesium-contaminated surface (paint, aluminum, stainless steel, and cement) with DeconGel 1101 as a commercially available strippable coating agent.

As a result of removing the radioactive cesium applied onto the simulated contaminated surface (paint, aluminum, stainless steel, and cement) according to Example 1 and Comparative Examples 1 to 4 by treating the radioactive cesium for about 3 hours and drying the radioactive cesium, the results of evaluating radioactive cesium removal performance are shown in the following Table 2.

TABLE 2

|  |  | Example 1 | Comparative Example 1 | Comparative Example 2 | Comparative Example 3 | Comparative Example 4 |
|---|---|---|---|---|---|---|
| Paint | A$_o$ (cpm) | 8855 | 8960 | 8876 | 9081 | 8747 |
|  | A$_f$ (cpm) | 743 | 4187 | 3385 | 3378 | 2022 |
|  | R | 91.61% | 53.27% | 61.86% | 62.80% | 76.89% |
| Aluminum | A$_o$ (cpm) | 11604 | 10431 | 10557 | 11380 | 11414 |
|  | A$_f$ (cpm) | 342 | 1679 | 714 | 1030 | 567 |
|  | R | 97.05% | 83.90% | 93.24% | 90.95% | 95.03% |
| Stainless steel | A$_o$ (cpm) | 11278 | 11641 | 12318 | 11006 | 11599 |
|  | A$_f$ (cpm) | 674 | 3196 | 1417 | 1946 | 1064 |
|  | R | 94.03% | 72.54% | 88.50% | 82.32% | 90.83% |
| Cement | A$_o$ (cpm) | 2911 | 2770 | 4205 | 3051 | 2815 |
|  | A$_f$ (cpm) | 1824 | 2263 | 3226 | 2427 | 1924 |
|  | R | 37.34% | 18.32% | 23.3% | 20.46% | 31.67% |

*R = (A$_0$ − A$_f$)/A$_o$ × 100 (A$_o$ = Concentration of radioactive cesium on the simulated contaminated surface before removal of radioactive cesium, and A$_f$ = Concentration of radioactive cesium on the simulated contaminated surface after removal of radioactive cesium)

As shown in Table 2, as a result of removing radioactive cesium applied onto the simulated contaminated surface (paint and cement) according to Example 1, it is confirmed that the radioactive cesium removal performance (R) is excellent as compared to Comparative Examples 1 to 4. In addition, Example 1 has an advantage in that a large amount of contaminated water is not generated, unlike Comparative Examples 1 and 2. Meanwhile, in the case of Comparative Examples 3 and 4, it is confirmed that radioactive cesium is removed to some degree, and this can be seen as a result of the anionic carboxyl group in the second polymer adsorbing a portion of positively charged radioactive cesium.

As a result of removing the radioactive cesium applied onto the simulated contaminated surface (paint and cement) according to Example 1 and Comparative Example 5 by treating the radioactive cesium for about 24 hours and drying the radioactive cesium, the results of evaluating radioactive cesium removal performance are shown in the following Table 3.

TABLE 3

|  |  | Example 1 | | Comparative Example 5 | |
|---|---|---|---|---|---|
| Time |  | 3 hours | 24 hours | 3 hours | 24 hours |
| Paint | A$_o$(cpm) | 8855 | — | — | 9135 |
|  | A$_f$(cpm) | 743 | — | — | 1761 |
|  | R | 91.61% | — | — | 80.79% |
|  | DF | 11.92 | — | — | 5.19 |
| Cement | A$_o$(cpm) | 2911 | 3067 | — | 2738 |
|  | A$_f$(cpm) | 1824 | 1432 | — | 2111 |
|  | R | 37.34% | 53.30% | — | 22.89% |
|  | DF | 1.60 | 2.14 | — | 1.30 |

* R = (A$_0$ − A$_f$)/A$_o$ × 100
* DF = A$_0$/A$_f$
(A$_o$ = Concentration of radioactive cesium on the simulated contaminated surface before removal of radioactive cesium, and A$_f$ = Concentration of radioactive cesium on the simulated contaminated surface after removal of radioactive cesium)

As shown in Table 3, it is confirmed that even though the treatment time is 24 hours in the case of Comparative Example 5, both radioactive cesium removal performance (R) and the decontamination factor (DF) are lower than those in Example 1, as compared to the case where the treatment time is 24 hours as well as the case where the treatment is 3 hours, as in Example 1.

The above-described description of the present invention is provided for illustrative purposes, and the person skilled in the art to which the present invention pertains will understand that the present invention can be easily modified into other specific forms without changing the technical spirit or essential features of the present invention. Therefore, it should be understood that the above-described Examples are illustrative only in all aspects and are not restrictive.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for removing a radionuclide, the method comprising:
   (a) preparing a first aqueous solution containing a first polymer comprising a hydroxy group;
   (b) preparing a second aqueous solution containing a second polymer into which a boronic acid group is introduced as a functional group via a covalent bond;
   (c) forming a reversibly cross-linked hydrogel in which the radionuclide is adsorbed by spraying or applying each of the first solution and the second solution onto a radionuclide-contaminated surface, and then reversibly cross-linking the first polymer and the second polymer to each other via a dehydration condensation reaction under a pH condition of 5 to 12, wherein the boronic acid group is in an anionic state, and wherein a borate-ester bond is formed between the first polymer and the second polymer from the hydroxy group and the boronic acid group; and
   (d) selectively dissolving only the hydrogel by disintegrating the cross-linking via an immersion of the hydrogel in which the radionuclide is adsorbed in water,
   wherein an adsorbent for removing the radionuclide is further contained in the first solution or the second solution,
   wherein in step (c), at a frequency of 100 rad/s, the hydrogel in which the radionuclide is adsorbed has a storage modulus of 2,000 Pa to 10,000 Pa and a loss modulus of 100 Pa to 5,000 Pa.

2. The method of claim 1, wherein in step (c), the hydrogel in which the radionuclide is adsorbed is formed, and then a monovalent, divalent or trivalent ion solution for being additionally cross-linked to the second polymer is further sprayed.

3. The method of claim 1, wherein the first polymer is one or more selected from a group consisting of polyvinyl alcohol, arabic gum, guar gum, locust bean gum, and a derivative thereof.

4. The method of claim 1, wherein the second polymer comprises a skeleton comprising a carboxyl group or a carbonyl group.

5. The method of claim 4, wherein the skeleton is one or more selected from a group consisting of an alginate, poly(succinimide), poly(methyl vinyl ether-alt-maleic anhydride), polyacrylic acid, polyacrylamide, poly(N,N-dimethylacrylamide), and polyvinylpyrrolidone.

6. The method of claim 1, wherein the hydrogel comprises the first polymer and the second polymer in an amount of 3 parts by weight to 10 parts by weight and 1 part by weight to 5 parts by weight, respectively, based on 100 parts by weight of the hydrogel.

* * * * *